United States Patent
Banerjee et al.

(10) Patent No.: US 7,002,956 B2
(45) Date of Patent: Feb. 21, 2006

(54) NETWORK ADDRESSING METHOD AND SYSTEM FOR LOCALIZING ACCESS TO NETWORK RESOURCES IN A COMPUTER NETWORK

(75) Inventors: Dwip N. Banerjee, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 09/899,617

(22) Filed: Jul. 5, 2001

(65) Prior Publication Data
US 2003/0012225 A1 Jan. 16, 2003

(51) Int. Cl.
H04L 12/28 (2006.01)

(52) U.S. Cl. ...................... 370/389; 370/401
(58) Field of Classification Search ............. 370/388, 370/392, 400, 401, 389; 709/217, 218, 219, 709/220, 227, 228, 225
See application file for complete search history.

(56) References Cited

U.S. PATENT DOCUMENTS

| | | | | |
|---|---|---|---|---|
| 5,644,575 A | * | 7/1997 | McDaniel | 370/428 |
| 5,721,780 A | * | 2/1998 | Ensor et al. | 713/155 |
| 5,812,819 A | * | 9/1998 | Rodwin et al. | 703/23 |
| 6,233,616 B1 | * | 5/2001 | Reid | 709/225 |
| 6,424,654 B1 | * | 7/2002 | Daizo | 370/401 |
| 6,584,095 B1 | * | 6/2003 | Jacobi et al. | 370/389 |
| 6,614,788 B1 | * | 9/2003 | Martin et al. | 370/392 |
| 6,633,865 B1 | * | 10/2003 | Liao | 707/3 |
| 6,678,732 B1 | * | 1/2004 | Mouko et al. | 709/227 |

* cited by examiner

*Primary Examiner*—Andy Lee
(74) *Attorney, Agent, or Firm*—Herman Rodriguez; Edmond A. DeFrank

(57) ABSTRACT

An addressing method and a system for assigning network addresses such that access to a network resource remains local. This is accomplished by allocating a local network address in favor of a remote network address. A process executing on a processor makes a request for a network address. A local network address is located in memory of the processor executing the process. The local network address is assigned, if available. Otherwise, a remote network address located in the memory of another processor is assigned. Preferably, the network address request contains information about on which processor the requesting process is running. Using this information, the present invention is able to select a network address that resides in the local memory of that processor. The network address allocation system of the present invention includes a network address allocator that uses the method of the present invention as outlined above.

20 Claims, 6 Drawing Sheets

NETWORK ADDRESSING METHOD AND SYSTEM FOR LOCALIZING ACCESS TO NETWORK RESOURCES IN A COMPUTER NETWORK

BACKGROUND OF THE INVENTION

1. Field of the Invention

The present invention relates in general to computer networks and more particularly to an addressing method and system for allocating a local network address in favor of a remote network address. The local network address is a network address that resides in memory of a processor that is executing the process that is requesting the network address. The remote network address resides in memory of a different processor.

2. Related Art

Computer networks are widespread and vitally important to many types of enterprises including businesses, universities and government. In general, a computer network is two or more computers (or associated devices) that are connected by communication facilities. One type of computer network is a client/server computer network. The client/server computer network includes a server and one or more clients. The server is a computer that provides shared resources to users of the network. The client is a computer that users use to access the shared network resources provided by the server. The client accesses these network resources using the communication facilities. One example of a client/server computer network is the Internet (via the World Wide Web (WWW)). The Internet is a public wide area network (WAN) environment that enables remote clients to request and receive data from a server and access network resources (such as memory).

The server computer may include several different computers (called nodes). In addition, each node may contain multiple processors. Each node often has its own network resources that may be used by the processors on that node. One type of network resource is a network adapter card. A network adapter card transmits and receives information from the computer network. The network adapter card is used by a process executing on a processor to send or receive data from the network.

Some multi-node servers allow the network resources of each node to be shared among other nodes on the server. Thus, if a network resource on one node is being used an available network resource on another node may be used by a process. Sharing of network resources allows a process executing on any of the processors to access to any available a network resource on the multi-node server. By way of example, if a multi-node server has four nodes with a network adapter card on each node, a process executing on a node one processor could access any of the network adapter cards located on nodes one to four. Sharing of network resources has the advantage of decreasing wait time for a process trying to use a network resource.

Another network resource that may be shared in a multi-node server environment is memory. When memory is shared between processors, the memory is distributed so that each processor "owns" a portion of the total memory. In this distributed memory technique, the portion of the total memory that belongs to a specific processor is called local memory. The portion of the memory belonging to other processors is called remote memory. When memory is shared, a process executing on a processor can have access to both local memory and remote memory. This allows a processor that is using all of its local memory to access additional, remote memory so that the process running on the processor can continue processing.

In order to access a network resource a process must obtain a network address. The process requests the network address from an addressing server. In a multi-node server environment having shared resources, the local memory of each processor has stored therein a certain number of network addresses. For example, the local memory of a processor may contain six to eight network addresses. A list of the network addresses and their location in memory is maintained by the addressing server.

When allocating network addresses, current addressing techniques do not differentiate between network addresses residing in local memory or in remote memory. Local memory means memory that is owned by the processor executing the process that is requesting the network address. Remote memory means memory that is owned by another processor. These current addressing techniques allocate the next network address on the list when they receive a request for a network address from a process.

One problem, however, is that these current addressing techniques do not take into account whether the network address being assigned resides in local memory or remote memory. This is important, because access time to local memory is much shorter than access time to remote memory. Accordingly, the time to access a network resource increases or decreases depending upon which network address is assigned. If a local network address is allocated then access time is decreased. On the other hand, if a remote network address is allocated then access time increased.

By way of example, assume that a process is running on processor one, node one and needs to access the network. The process makes a request for a network address to the addressing server. Current addressing techniques will allocate the next network address on the list. If the network address happens to be located in the local memory of processor one, node one, then access time to the network will be faster than if the network address resides in memory of another processor.

This disparity in access times is because the process requesting the network adapter card is executing on processor one, node one, and therefore it is local when a network address residing in the memory of processor one, node one is assigned. On the other hand, when a network address residing in the memory of a different processor is assigned to the same process, the process must remotely access the memory of this remote processor. This increases the time required to access the network adapter card.

Therefore, what is needed is an addressing method and system using distributed memory that allocates a network address residing in local memory in favor of a network address located in remote memory. In particular, what is needed is an addressing method and system for assigning network addresses so that, to the extent possible, a network address located in local memory is allocated. Moreover, what further is needed is an addressing method and system for dynamically assigning network addresses helps to optimize network performance by facilitating local access to network resources by allocating local network addresses.

SUMMARY OF THE INVENTION

To overcome the limitations in the prior art as described above and other limitations that will become apparent upon reading and understanding the present specification, the present invention includes an addressing method and a system that assigns a network address residing in local memory in favor of a network address residing in remote memory. Local memory is owned by the processor on which the process requesting the network address is executing. Remote memory is owned by another processor. Access to a network resource is local when a local network address is used, while access is remote when a remote network address is used.

Current addressing techniques assign a network address without regard to the difference between local and remote access. On the other hand, the present invention determines which processor is executing the process making the network address request. Using this information, the present invention allocates a network address such that access to the network resource is local. This local access reduces access time to the network resource.

The method of the present invention includes a method for assigning a network address such that a network address residing in local memory is assigned before a network address residing in remote memory. In particular, the method first determines whether a local network address residing in local memory is available. Local memory means that memory that is owned by the processor on which the requesting process is executing. If a local network address is available, then it is assigned before other network addresses residing in remote memory. Allocation of a local network address means that the process will have local access to the network resource. If a local network address is not available, then a remote network address is allocated. A remote network address is located in the local memory of a processor that is not executing the requesting process. In this situation, the process will have remote access to the network resource.

In a preferred embodiment, network address allocation of the present invention is performed using an addressing table containing network addresses. The table contains sections with each section containing network addresses located in the local memory of each processor. Using the information provided in the request, the addressing technique first looks for a network address within a section corresponding to the processor on which the requesting process is running. If a local network address is available, then it is assigned and access to a network resource remains local. Otherwise, the first available network address is assigned (and is a remote network address). The network address allocation system of the present invention includes a network address allocator that uses the method of the present invention as outlined above.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
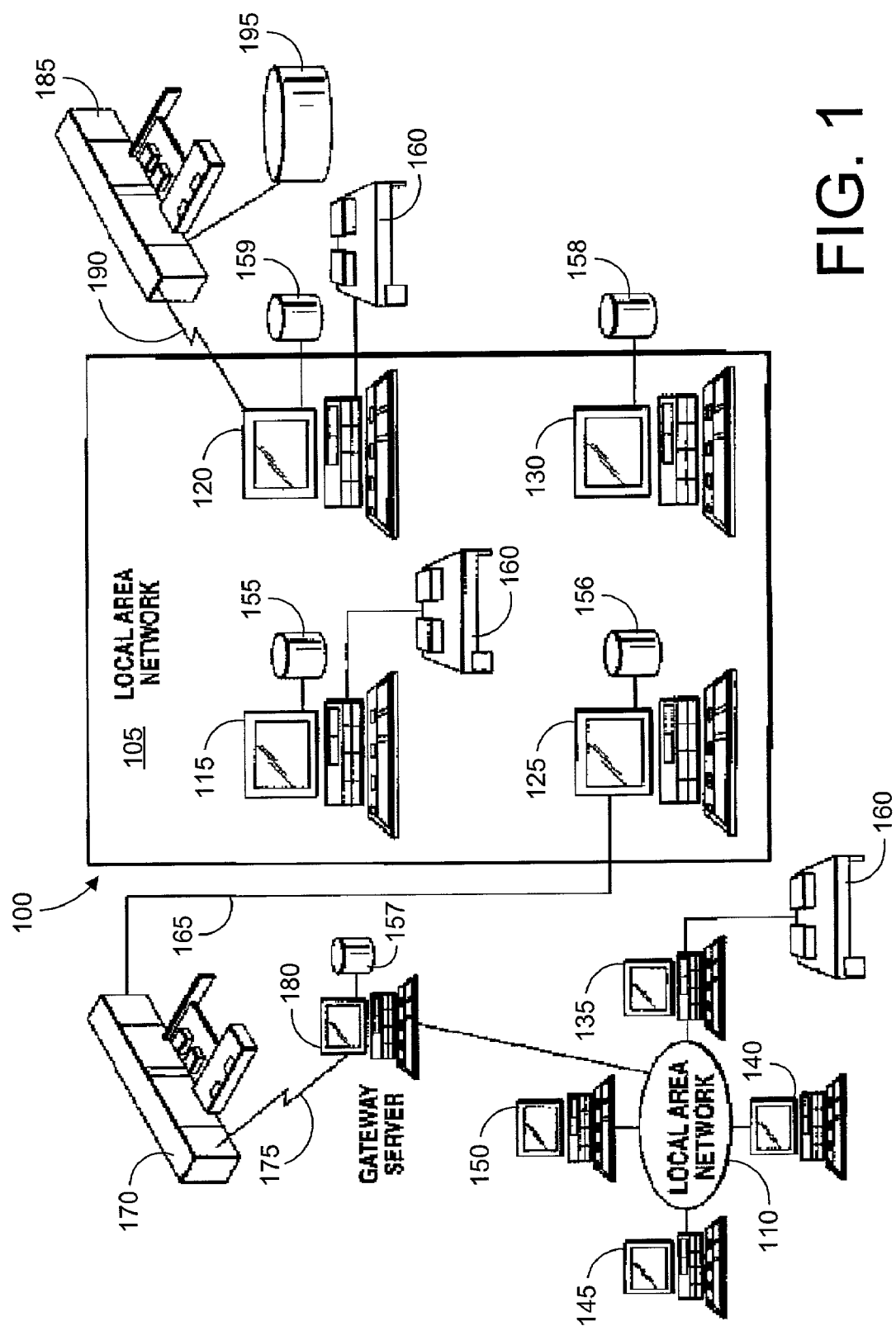
FIG. 1 illustrates a conventional hardware configuration for use with the present invention.

The following discussion is designed to provide a brief, general description of a suitable environment in which the present invention may be implemented. It should be noted that FIG. 1 depicts only one of several ways in which the present invention may be implemented. FIG. 1 illustrates a conventional hardware configuration for use with the present invention. In particular, an enterprise computer system 100 may include one or more networks, such as local area networks (LANs) 105 and 110. Each of the LANs 105, 110 includes a plurality of individual computers 115, 120, 125, 130, 135, 140, 145 and 150. The computers within the LANs 105, 110 may be any suitable computer such as, for example, a personal computer made by International Business Machines (IBM) Corporation, located in Armonk, N.Y. Typically, each of the plurality of individual computers is coupled to storage devices 155, 156, 157, 158 and 159 (such as a disk drive or hard disk) that may be used to store data (such as modules of the present invention) and computer-executable instructions in accordance with the present invention. Each of the plurality of individual computers 115, 120, 125, 130, 135, 140, 145,150 also may be coupled to an output device 160 (such as a printer) for producing tangible output. The LANs 105, 110 may be coupled via a first communication link 165 to a communication controller 170, and from the communication controller 170 through a second communication link 175 to a gateway server 180. The gateway server 180 is preferably a personal computer that serves to link the LAN 105 to the LAN 110.

The computer system 100 may also include a plurality of mainframe computers, such as a mainframe computer 185, which may be in communication with one or more of the LANs 105, 110 by means of a third communication link 190. The mainframe computer 185 is typically coupled to a storage device 195 that is capable of serving as a remote storage for one or more of the LANs 105, 110. Similar to the LANs 105, 110 discussed above, the storage device may be used to store data and computer-executable instructions in accordance with the present invention. Those skilled in the art will appreciate that the mainframe computer 185, the LAN 105 and the LAN 110 may be physically located a great distance from each other. By way of example, a user may use a client system of the mainframe computer 185 to access information located on a server of the LAN 105.

II. General Overview and Components of the Invention

The present invention includes an addressing method and a system for providing a process (such as an application) running on a processor access to a network resource such that the access remains local. Local access means that a network address located in local memory of the processor running the requesting process is used. This local access reduces access times to a network resources as compared to using a network address that is located on a remote processor's memory.

Figure 2:
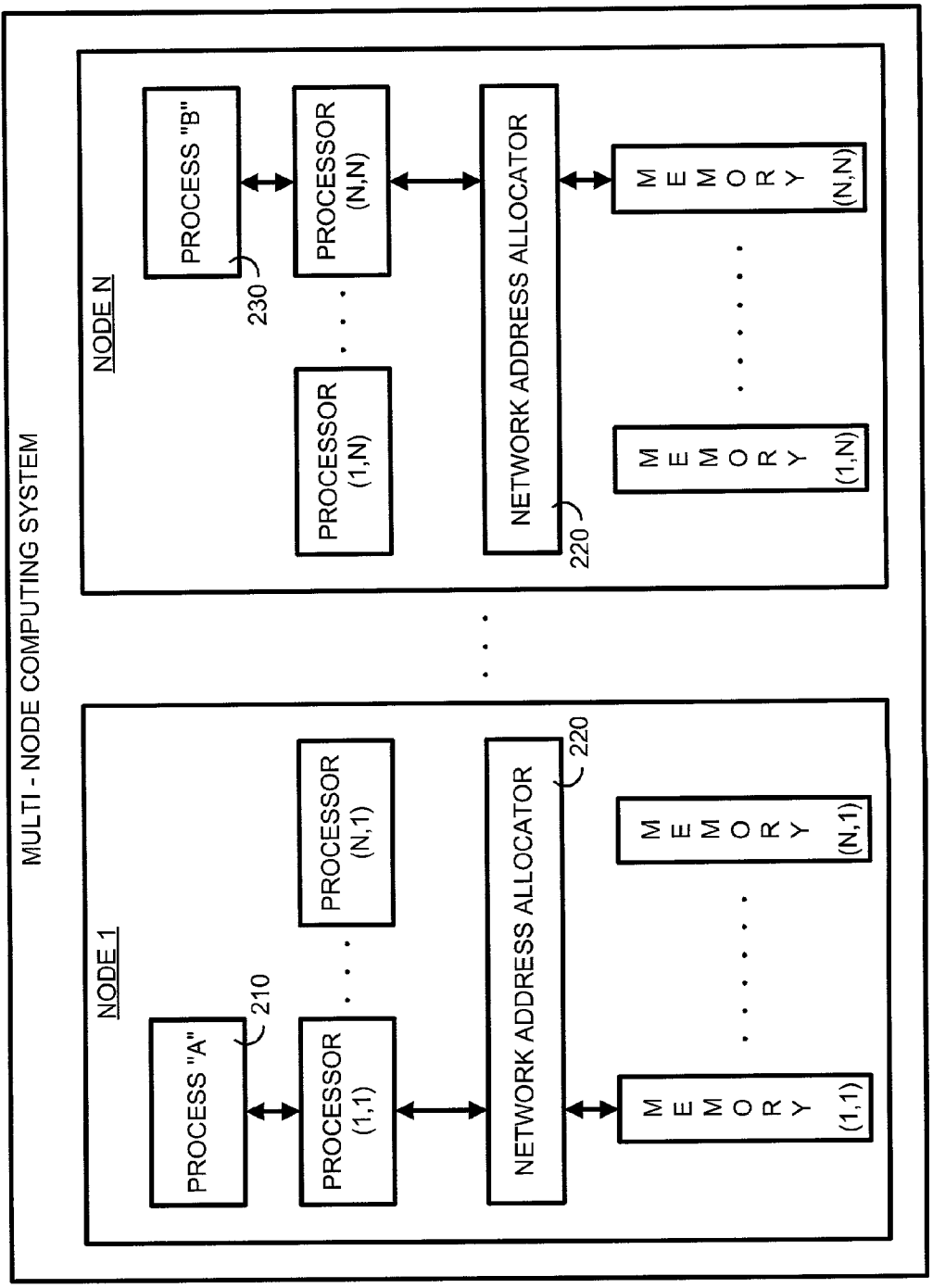
FIG. 2 is a general block diagram illustrating an overview of the present invention.

FIG. 2 is a general block diagram illustrating an overview of the present invention. A multi-node computing system 200 connected to a network includes a plurality of computers or nodes (node 1 to node N). Each of the plurality of nodes includes multiple processors for performing processing tasks. It should be noted that in FIG. 2 the processors are identified by a processor number and node. Thus, as shown in FIG. 2, processor 1 on node 1 is denoted as processor (1,1) and processor 1 on node N is denoted as processor (1,N). Each processor also includes memory that is local to the processor (denote memory 1 to memory N on nodes 1 to node N). Each of these local memories contains network addresses. The network address allocator 220 allows a process (such as an application) executing or running on a processor to have access to the network (through a network adapter card) and provides a means for the process to send and receive data over the network.

By way of example, FIG. 2 illustrates a process "A" 210 that is executing on processor (1,1). At this point process "A" does not have access to the network. In order to obtain network access, process "A" 210 sends a request to the network address allocator 220 of the present invention requesting access to a network adapter card. The multi-node computing system 200 is operating in a network resource distribution environment such that processor (1,1) can have access to any available network adapter card. However, the network address allocator 220 of the present invention attempts to map process "A" 210 executing on processor (1,1) to the network address in local memory (1,1). Using this local network address, process "A" is able to access the network adapter card such that that data access and transfer remains local. In this example, network addresses contained in local memory (1,1) are local to processor (1,1) and, if available, one of these network addresses is assigned to process "A" 210 to give process "A" 210 local network access.

In a similar manner, a process "B" 230 is executing on processor (N,N). If process "B" 230 sends a request for network access to the network address allocator 220, the allocator 220 will make every effort to assign a network address such that network access is local. In this case, if a network address contained in local memory (N,N) is available, then one of these local network addresses is assigned such that access to a network adapter card remains local for process "B" 230. In this manner, access times for process "B" 230 to access a network adapter card are reduced, thereby increasing network performance.

Figure 3:
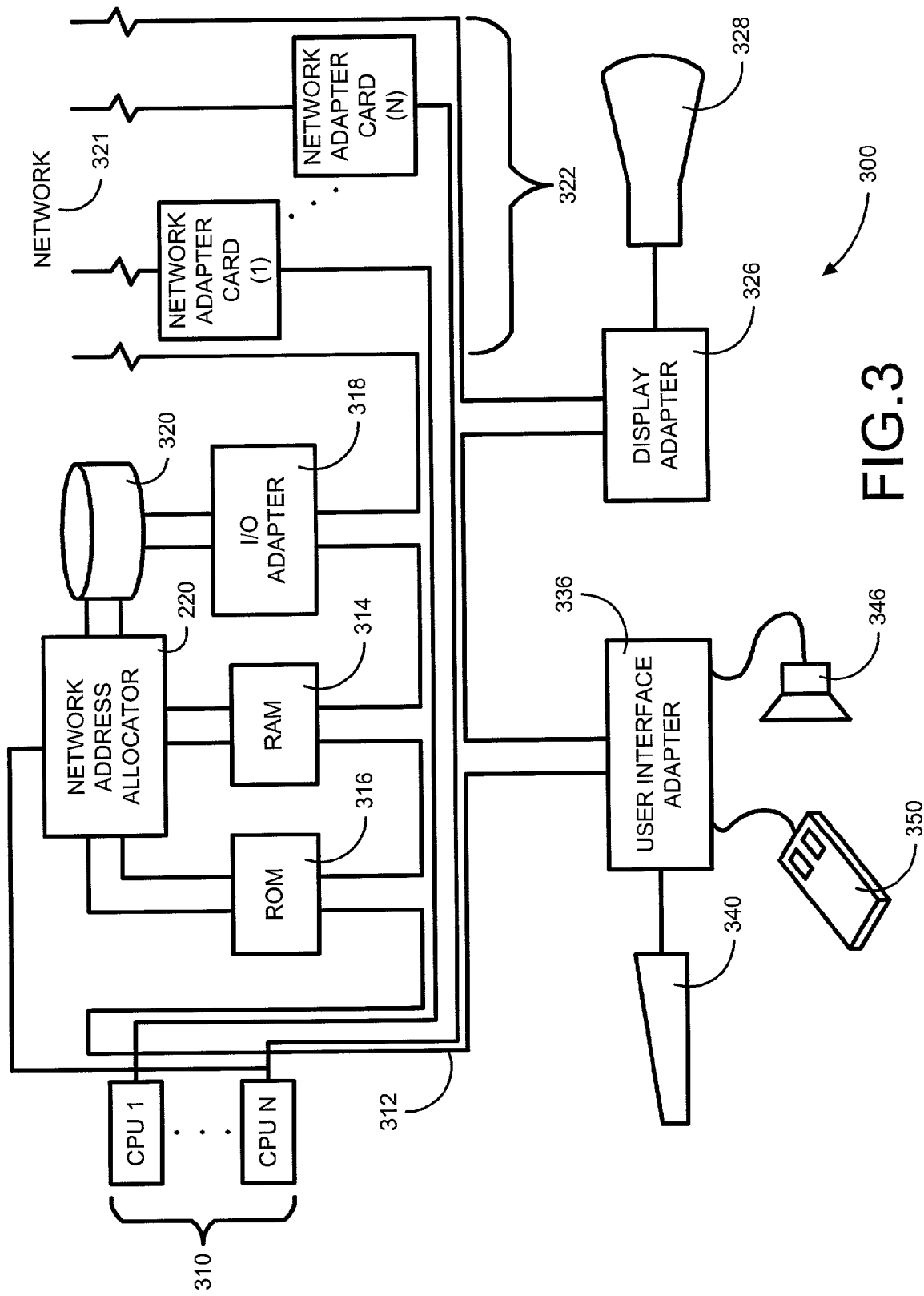
FIG. 3 is a block diagram of an individual node of FIG. 2 incorporating the present invention and is shown for illustrative purposes only.

FIG. 3 is a block diagram of an individual node of FIG. 2 incorporating the present invention and is shown for illustrative purposes only. A computer 300 includes a plurality of any suitable central processing units (CPU 1 to CPU N) 310, such as standard microprocessors, and any number of other objects interconnected by a system bus 312. For purposes of illustration, the computer 300 includes memory such as random-access memory (RAM) 314, read-only memory (ROM) 316, and storage devices (such as hard disk or disk drives 320) connected to the system bus 312 by an input/output (I/O) adapter 318. The computer 300 may be a network server that is capable of connecting and interacting with a plurality of client machines over a communication channel (such as a network 321). Connection to and interaction with the network 321 is made possible by using at least one of a plurality of network adapter cards (1 to N). As shown in FIG. 3 by the lines, CPU 1 is connected to network adapter card 1 through a local network address while CPU N is connected to network adapter card N through a local network address. It should be noted that a process running on CPUs 1 to N can use any of the network adapter cards (1) to (N) if they are available. Moreover, although local network addressing is preferred, CPU 1 and CPU N may also access network adapter card (1) and network adapter card (N) using a remote network address. However, this type of remote access to the network adapter cards requires more access time than if the access remained local.

At least one of the memory devices (such as the RAM 314, ROM 316, and hard disk or disk drives 320) contains the network address allocator 220 of FIG. 2. In accordance with the present invention, the network address allocator may contain computer-executable instructions for carrying out the present invention. As discussed in detail below, the network address allocator 220 provides local access to the network 321 for a process running on one of the plurality of CPUs 310. This is accomplished in part by having the network address allocator 220 assign a network address such that the network address is located in the local memory of the processor running the requesting process. In a preferred embodiment, the network addresses are located in an addressing table (not shown) that includes sections for network addresses corresponding to CPUs 1 to N. The network addresses in each section are local to that processor. In addition, although other processors have access to network addresses in other sections, these network addresses are remote.

The computer 300 may further include a display adapter 326 for connecting the system bus 312 to a suitable display device 328. In addition, a user interface adapter 336 is capable of connecting the system bus 312 to other user interface devices, such as a keyboard 340, a speaker 346, a mouse 350 and a touchpad (not shown). In a preferred embodiment, a graphical user interface (GUI) and an operating system (OS) reside within a computer-readable media and contain device drivers that allow one or more users to manipulate object icons and text on the display device 328. Any suitable computer-readable media may retain the GUI and OS, such as, for example, the RAM 314, ROM 316, hard disk or disk drives 320 (such as magnetic diskette, magnetic tape, CD-ROM, optical disk or other suitable storage media).

III. Operational Overview

In general, the operation of the present invention is an addressing technique that assigns network addresses such that access to a network resource remains local. The present invention accomplishes this using network addressing that assigns local network addresses. More specifically, a process executing on a processor is able to obtain a network address that resides in the local memory of the processor so that access to a network resource is local. Every resource that is connected to the network must have an address on the network that identifies the resource and lets other resources know where to find the resource on the network. By allocating network addresses such that network addresses corresponding to local access are preferred, the present invention reduces access times and increases network performance.

Instead of giving each resource a permanent network address, a common technique is to provide dynamic addressing such that a resource has a different network address every time the resource connects to the network. Dynamic addressing simplifies administration because a new resource can be added to the network without manually assigning the resource a permanent network address. A popular dynamic addressing protocol is called dynamic host configuration protocol (DHCP). DHCP is for use on networks using transport control protocol/internet protocol (TCP/IP), such as the Internet. DHCP dynamically assigns an internet protocol (IP) address to a resource each time the resource is connected to the network.

Figure 4:
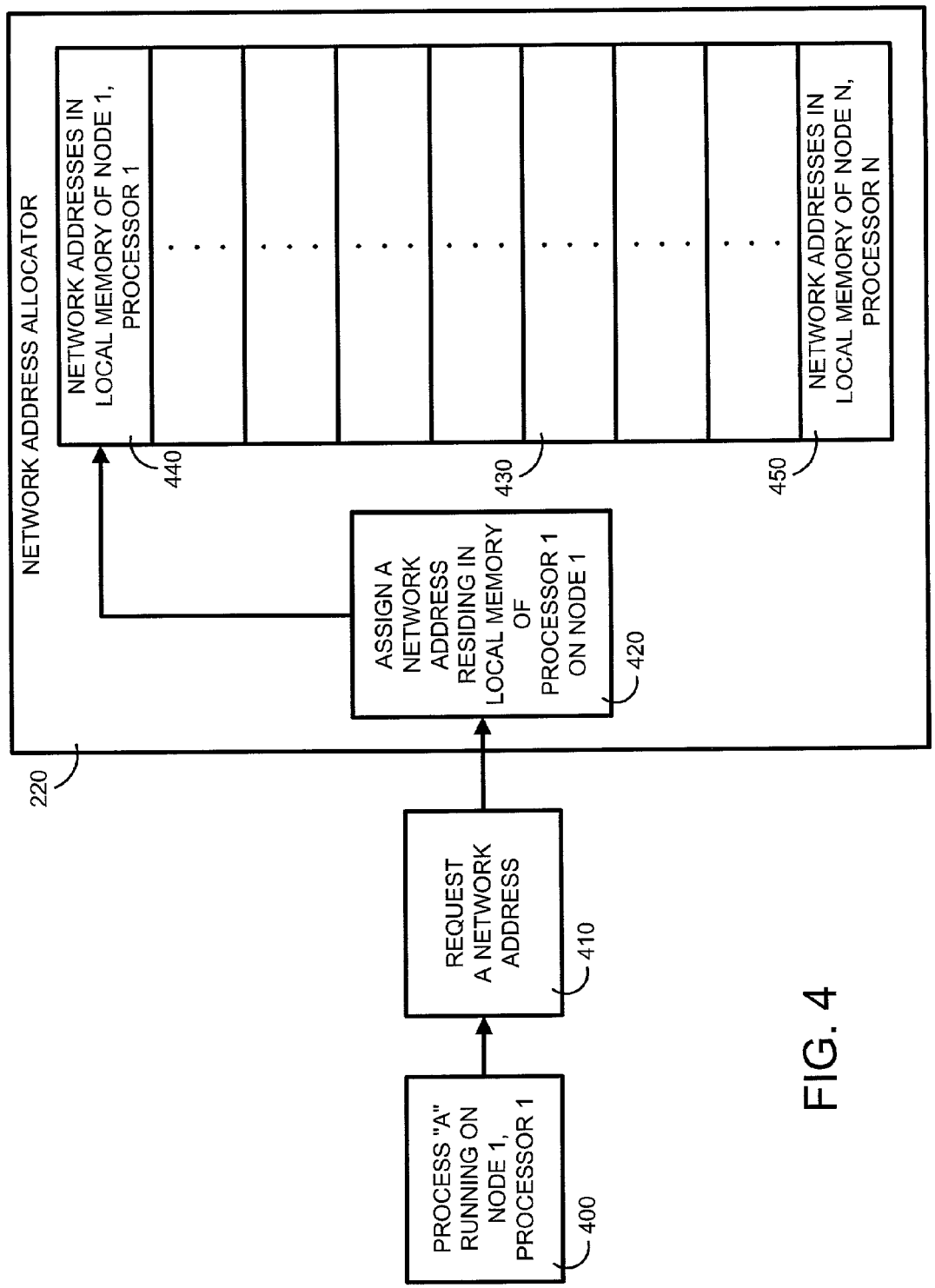
FIG. 4 is a block/flow diagram illustrating the network address allocator of the present invention.

In the present invention, the network address allocator 220 provides network addressing such that access to network resources is localized. FIG. 4 is a block/flow diagram illustrating the operation of the network address allocator 220 of the present invention. As shown in FIG. 4, process "A" is executing on node 1, processor 1 (box 400). Process "A" sends a request to the network address allocator 220 requesting a network address (box 410). The network address allocator 220 receives the request and assigns a network address that is located in the local memory of processor 1, node 1, the processor that is executing process "A" (box 420). This local address allocation ensures that whenever access to a network resource (such as a network adapter card) is required, access will be local.

In a preferred embodiment, address allocation is accomplished using an addressing table 430. The addressing table 430 is a data structure (such as a hash table) that contains network addresses. Each section of the addressing table 430 contains a plurality of network address that reside in local memory of each of the processors. For example, as shown in FIG. 4, the first section of the addressing table 430 includes network addresses in local memory of processor 1 on node 1 (box 440). This continues for each processor throughout the addressing table 430 until a final section of the addressing table 430 includes network addresses in local memory of processor N on node N (box 450).

When the network address allocator 220 receives the request from process "A" running on processor 1 of node 1, the allocator assigns process "A" a network address from the section of the addressing table 430 that contains the network addresses in local memory of processor 1 on node 1 (box 440). If available, a network address from this section is allocated such that process "A" uses this allocated address to obtain local access to a network resource. By way of example, suppose that a process "A" running on a processor 1 of node 1 needs to access the network. Process "A" requests a network address from the network address allocator 220. The addressing table 430 is used to allocate a network address residing in the local memory of processor 1 of node 1. If there are no network addresses available in this section then addresses from another section are allocated.

Figure 5:
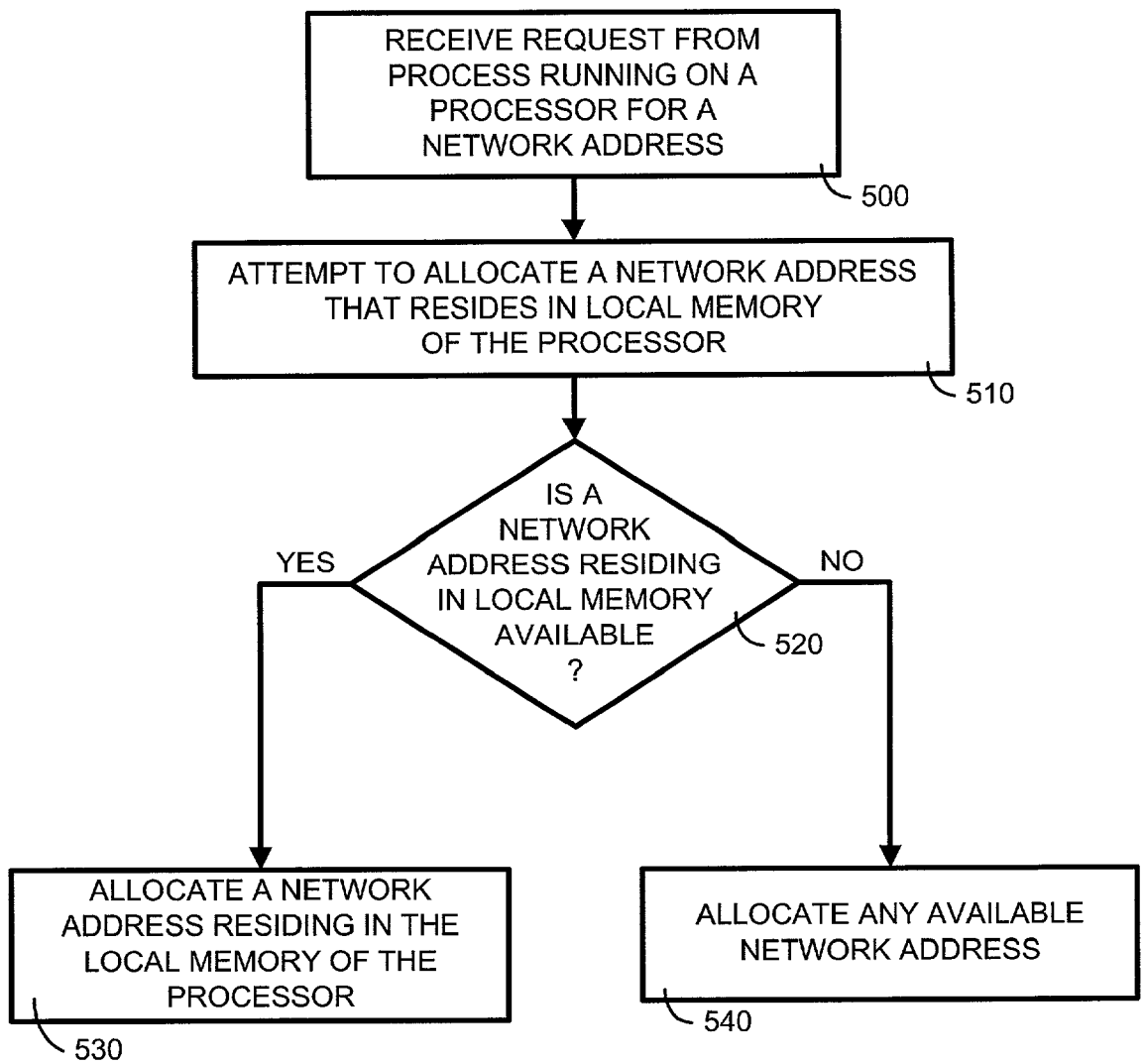
FIG. 5 is a flow diagram illustrating the general operation of the network address allocator.

FIG. 5 is a flow diagram illustrating the general operation of the network address allocator 220 of present invention. First, a request is received from a process executing on a processor requesting a network address (box 500). Next, the network address allocator 220 attempts to allocate a network address that resides in local memory of the processor (box 510). A determination is then made as to whether a network address from this local memory is available (box 520). If so, then the network address allocator 220 allocates a network address residing in the local memory of the processor (box 530). Otherwise, no network addresses residing in the local memory of the processor are available, and the network address allocator 220 allocates any available network address (box 540).

IV. Operational Detail and Working Example

The network address allocator 220 of the present invention allocates network addresses located in local memory of a processor such that access to a network resource is localized. In a preferred embodiment, this achieved by extending the DHCP protocol so that a process requesting a network address can specify on which processor the process is executing and request a network address residing in the local memory of a processor on which the requesting process is executing. In this preferred embodiment, the addressing table 430 is a hash table and an addressing request includes an inverse hash function that maps the process to a local network resource.

In order to illustrate the above method of the present invention, a working example is presented. It should be noted that this example is only one of many implementations of the present invention that is possible, and is provided for illustrative purpose only. In this working example, a dynamic host configuration protocol (DHCP) is used and the addressing table 430 is a hash table having connection information in the form of protocol control blocks (PCBs). PCBs contain all the information related to connections. Ideally, while processing connections, all PCB accesses should be local for optimized performance. In this working example, the PCB hash table has a size of 256 and is distributed over four nodes with each node computer having four central processing units (CPUs). The PCB hash table, which in this working example is a block distribution (where data is distributed in blocks, i.e., a continuous set of data), is as follows:

elements 0 ... 15 are mapped to CPU 0, Node 0 elements 16 ... 31 are mapped to CPU 1, Node 0 elements 32 ... 47 are mapped to CPU 2, Node 0 elements 48 ... 63 are mapped to CPU 3, Node 0 elements 64 ... 79 are mapped to CPU 0, Node 1 elements 80 ... 95 are mapped to CPU 1, Node 1

$$\vdots$$

elements 240 ... 255 are mapped to CPU 3, Node 3 such that each CPU in each node owns a portion of the PCB hash table.

If a process executing on CPU 1, Node 1 requests an IP address for a network adapter card, it makes sense for DHCP to allocate the process an IP address such that the process gets mapped to the section containing a network address that is in the local memory of that processor. Thus, assuming the network address allocator 220 always tries to bind processes that send and receive data on the network adapter card to the same processor, the IP address would get mapped to the section contained on that processor, or in this working example elements 80 through 95 and processor CPU 1 on Node 1.

In this working example, DHCP is capable of allocating IP addresses in the range 192.4.7.040 through 192.4.7.250 and the hash function is as follows:

$$h = (\text{last 3 digits of } IP \text{ address}) \text{ MOD } SZ$$

where SZ is the size of the hash table, which is 256 in this working example and where MOD represents a remainder. If DHCP allocates an IP address such as 192.4.7.201 or 192.4.7.237 the hash function, h, will map the PCB hash table to the following hash entries:

201 MOD 256=201 (which is mapped to CPU 0, Node 3)

237 MOD 256=237 (which is mapped to CPU 2, Node 3)

and neither of these get mapped to CPU 1, Node 1.

If DHCP assigns the IP address 192.4.7.087 then the hash function, h, will map the PCB to the following hash entry:

087 MOD 256=087 (which is mapped to CPU1, Node 1)

and the desired assignment of a local network address can occur. Thus, if all processes accessing this adapter are mapped to CPU1, Node 1, then the processes are guaranteed to have local data access when the processes use the PCB hash table and thus greatly improve performance.

In the working example, DHCP receives the parameters (1,1) indicating that the requester desires an IP address that maps to the segment in CPU 1, Node 1 (elements 80 through 95). In addition, the function pointer is also sent by the requester indicating which hash function to apply as well as the nature of the distribution (a block distribution in this working example). Using this information, DHCP is able to determine the range (80 through 95) in which the result must be constrained.

Figure 6:
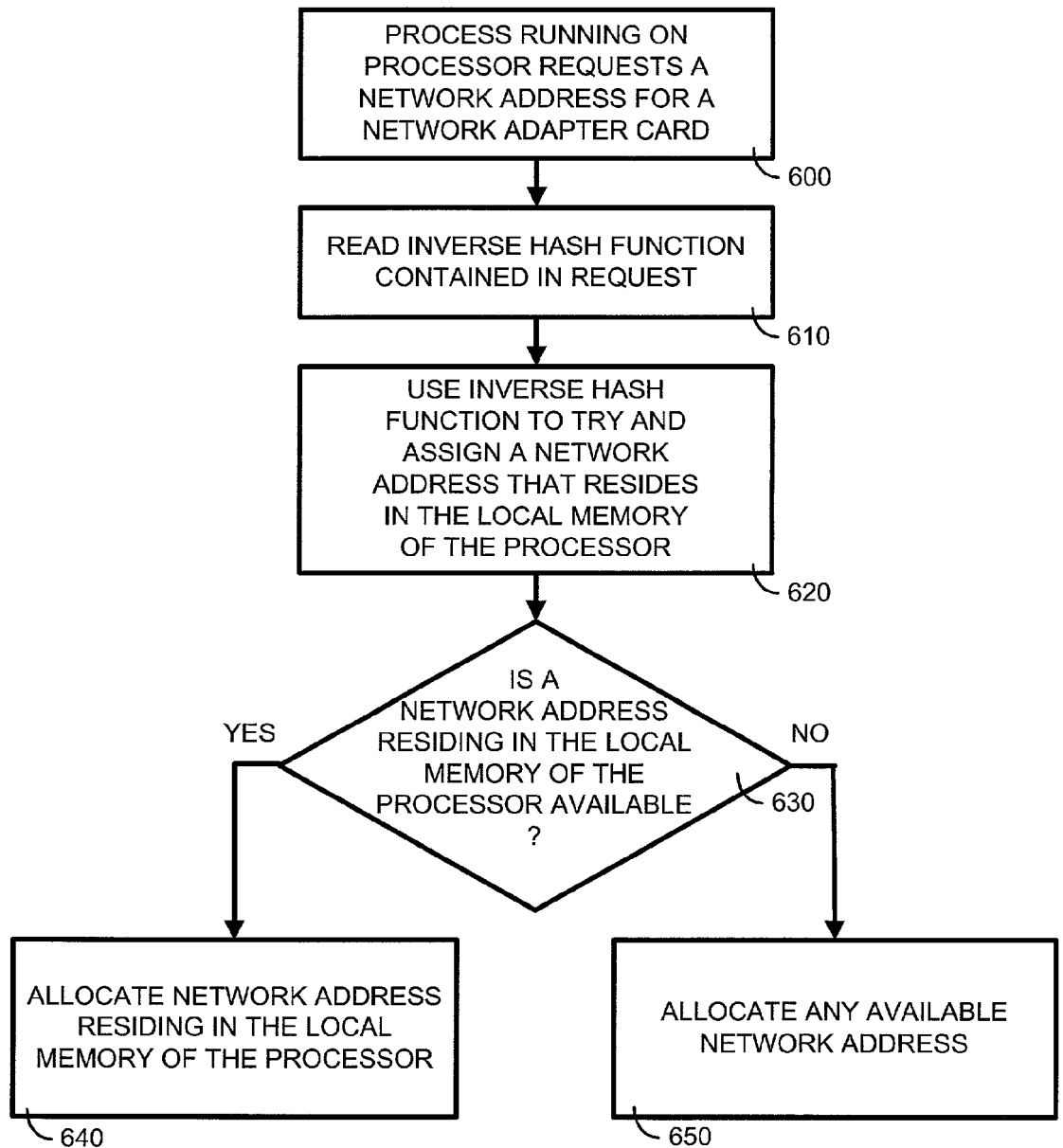
FIG. 6 is a detailed flow diagram illustrating a working example of the present invention.

FIG. 6 is a detailed flow diagram illustrating this working example. First, a process executing on a processor requests a network address for a network adapter card (box 600). The address request contains an inverse hash function so that the inverse hash function is read (box 610) and the network address allocator 220 map the processor executing the process to the addresses corresponding to the processor's section of the hash table. Using the inverse hash function, the network address allocator 220 tries to allocate a network address that resides in the local memory of the processor (box 620). A determination is then made as to whether a network address residing in the local memory of the processor is available (box 630). If so, then the network address allocator 220 allocates a network address residing in the local memory of the processor (box 640). Otherwise, the network address allocator 220 allocates any available network address (box 650), which will be a network address residing in the local memory of another processor (i.e. remote memory).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for assigning a network address upon request to a process executing on a processor, comprising:

requesting a network address for a network adapter card for creating a mapping of the process executing on the processor to a local network address;

determining whether a the local network address residing in memory of the processor is available; and using the mapping for assigning the local network address to the process in favor of other network addresses if the local network address is available.

2. The method as set forth in claim 1, wherein the other network addresses are remote network addresses residing in memory of other processors.

3. The method as set forth in claim 2, further comprising allocating one of the remote network addresses if the local network address is not available.

4. The method as set forth in claim 1, further comprising determining that the process is executing on the processor.

5. The method as set forth in claim 4, further comprising sending information in the request identifying the processor.

6. The method as set forth in claim 1, further comprising using an addressing table to store the local address and the other network addresses.

7. The method as set forth in claim 6, wherein the addressing table is a data structure.

8. The method as set forth in claim 7, wherein the data structure is a hash table.

9. A computer-readable medium having computer-executable instructions for performing the method as set forth in claim 1.

10. A network address allocation system for assigning a network address, comprising:

a multi-node server having a plurality of processors;

memory for each of the plurality of processors, with each memory containing at least one network address;

a process executing on one of the plurality of processors capable of making a network address request, wherein the process requests a network address for a network adapter card for creating a mapping of the process executing on the processor to a focal network address; and a network address allocator that receives the network address request and uses the mapping to allocate a local network address located in the memory of the processor executing the process.

11. The network address allocation system as set forth in claim 10, wherein the memory for the processor executing the process is local memory.

12. The network address allocation system as set forth in claim 10, wherein the memory for the processors not executing the process is remote memory.

13. The network address allocation system as set forth in claim 10, wherein the network address allocator further comprises an addressing table containing a list of the network addresses located in the memory for each of the plurality of processors.

14. The network address allocation system as set forth in claim 10, wherein the network address request contains information about the processor that is executing the process.

15. A method for assigning a network address, comprising:

receiving a network address request from a process executing on a processor;

creating a mapping of the process executing on the processor to a local network address;

determining whether a network address contained in a memory of the processor is available; and assigning the network address, if available, in response to the network address request.

16. The method as set forth in claim 15, further comprising providing information in the network address request that the process is executing on the processor.

17. The method as set forth in claim 16, further comprising using the information to identify the memory of the processor.

18. The method as set forth in claim 15, wherein the network address is a local network address and other network addresses contained in a memory of other processors are remote network addresses.

19. The method as set forth in claim 18, wherein assigning the network address includes assigning the local network address in favor of the remote network addresses.

20. The method as set forth in claim 18, further comprising assigning on of the remote network addresses if the local network address is not available.

* * * * *